(12) United States Patent
Pachao-Morbitzer et al.

(10) Patent No.: US 6,957,933 B2
(45) Date of Patent: Oct. 25, 2005

(54) THREADING INSERT WITH COOLING CHANNELS

(75) Inventors: Nelson M. Pachao-Morbitzer, Zárate (AR); Hugo A. Ernst, Buenos Aires (AR)

(73) Assignee: Siderca S.A.I.C., Buenos Aires (AR)

( * ) Notice: Subject to any disclaimer, the term of this patent is extended or adjusted under 35 U.S.C. 154(b) by 94 days.

(21) Appl. No.: 10/448,403

(22) Filed: May 30, 2003

(65) Prior Publication Data

US 2004/0240949 A1 Dec. 2, 2004

(51) Int. Cl.⁷ ............................................. B23Q 10/11
(52) U.S. Cl. ........................... 407/11; 407/119; 408/56
(58) Field of Search ............................... 407/11, 115, 2, 407/6, 118, 119; 408/56, 221; 470/207, 187; B23Q 10/11

(56) References Cited

U.S. PATENT DOCUMENTS

| 3,172,190 | A | * | 3/1965 | Beach ........................... 407/4 |
| 3,571,877 | A | * | 3/1971 | Zerkle ......................... 407/11 |
| 3,791,001 | A | | 2/1974 | Bennett ....................... 29/95 R |
| 4,123,194 | A | * | 10/1978 | Cave ........................... 408/221 |
| 4,409,868 | A | * | 10/1983 | Huddle et al. ............... 82/1.11 |
| 4,479,744 | A | | 10/1984 | Stricker |
| 4,572,713 | A | * | 2/1986 | Schmidt ..................... 407/114 |
| 4,854,785 | A | * | 8/1989 | Lowe et al. ................ 407/115 |
| 4,955,264 | A | * | 9/1990 | Armbrust ..................... 82/158 |
| 5,059,070 | A | * | 10/1991 | Baker .......................... 407/114 |
| 5,148,728 | A | * | 9/1992 | Mazurkiewicz .............. 82/1.11 |
| 5,549,425 | A | * | 8/1996 | Bernadic et al. ............ 407/114 |
| 5,628,590 | A | | 5/1997 | Beeghly et al. ............. 407/114 |
| 5,688,081 | A | | 11/1997 | Paya ........................... 407/115 |
| 5,704,734 | A | * | 1/1998 | Ashley et al. ................. 407/3 |
| 5,799,553 | A | * | 9/1998 | Billatos ....................... 82/1.11 |
| 5,890,852 | A | * | 4/1999 | Gress .......................... 408/221 |
| 5,901,623 | A | * | 5/1999 | Hong ............................ 82/50 |
| 6,065,554 | A | | 5/2000 | Taylor et al. ............... 175/430 |
| 6,312,324 | B1 | | 11/2001 | Mitsui et al. ............... 451/540 |
| 6,447,218 | B1 | * | 9/2002 | Lagerberg ................... 407/114 |
| 2003/0110781 | A1 | * | 6/2003 | Zurecki et al. ................ 62/64 |

FOREIGN PATENT DOCUMENTS

DE 3740814.3 12/1987

* cited by examiner

*Primary Examiner*—Derris H. Banks
*Assistant Examiner*—Sara Addisu
(74) *Attorney, Agent, or Firm*—Fitzpatrick, Cella, Harper & Scinto

(57) ABSTRACT

A metalworking apparatus includes a threading insert with a channel-less chip breaker and a holder for holding the threading insert. The threading insert includes (i) one cooling channel disposed on the top side of the threading insert for each crest and each valley, which terminates near the cutting region, and (ii) a ceramic coating on at least the cutting region of crests and valleys, with each cooling channel being uncoated.

11 Claims, 3 Drawing Sheets

THREADING INSERT WITH COOLING CHANNELS

BACKGROUND OF THE INVENTION

1. Field of the Invention

The instant invention relates to a metalworking apparatus including a cutting insert having cooling channels.

2. Description of the Related Art

In metalworking, a cutting insert such as the one shown in FIGS. 5 and 6 is often used to machine metals, such as by forming threads, on a lathe. The cutting insert 90 and a chip breaker 100 are held in a fixture 200. As shown in FIG. 6, the cutting insert has a cutting edge 92 that cuts the metal workpiece 1, forming a chip 3 consisting of the material removed from the workpiece. The chip breaker 100 breaks the chip so that the chip does not become too long, difficult to handle and dispose of.

Metalworking involves heat creation so, as shown in FIG. 6, cooling channels 80 are often provided to supply a cooling liquid to the workpiece where the cutting takes place. In the device shown in FIG. 6, the cooling channels are disposed in the chip breaker 100. However, cooling channels may be disposed in the cutting insert, as disclosed in U.S. Pat. No. 6,447,218 and German Publication No. 3740814.

More recently, it has been desirable to enable the use of the highest possible pressure in the cooling liquid and to supply the liquid in the form of one or more jets mainly directed towards the cutting insert and the chip, because as the pressure used in the liquid jet increases, the ability of the liquid jet to break up the chip increases. Liquid pressures as high as 2,800 bar are known, as disclosed in U.S. Pat. No. 5,148,728.

Notwithstanding the chip breaking effect of high pressure liquid, when a cutting insert, during an operation such as turning, cuts loose a chip from a rotating workpiece, usually of metal, considerable amounts of heat are generated. The actual cutting of the chip takes place in a primary shear zone, which is developed in a peripheral portion of the workpiece and extends obliquely upwards from the cutting edge of the cutting insert. By virtue of the high temperatures in the chip, the workpiece and cutting insert, the chip separated in the primary shear zone cannot slide away across the top side of the cutting insert without being influenced by both friction and adherence.

The very hot chip adheres to the top surface of the cutting insert along a certain contact length. The contact length extends away from the shear zone, which is near the cutting edge, a distance ranging from tenths of a millimeter to a few millimeters along the top of the cutting insert, depending on the material of the workpiece.

To remove the chip from the surface of the cutting insert and to break up the chip, modern high-pressure, cooling-liquid technology aims at introducing the cooling-liquid jet into the substantially wedge-shaped space provided between the bottom side of the chip and the top side of the cutting insert at the point where the chip is initially separated from the cutting insert. The idea is to form a so-called hydraulic wedge between the chip and the top side of the cutting insert so that the wedge can contribute to "break out" the chip and, as far as possible, reduce the extent of the contact length of the chip along the cutting insert. However, the attempts to improve the cooling and the flow of the chip away from conventional cutting insert carried out hitherto have not been entirely successful because of the coatings used on cutting inserts and the placement of the cooling channels.

In general, a threading insert has a tungsten carbide (WC) body or the like, and the surface has a special, very hard, ceramic coating for extending tool life, for example Titanium Nitride (NTi). We have recognized, however, that the hardening coatings are poor conductors. Moreover, the cooling channels are sometimes obstructed by the chip flow and therefore heat removal decreases. In addition, in conventional threading inserts, the cooling channels are coated with tungsten carbide, which reduces the effectiveness of the cooling liquid.

There is a need in the art for a cutting insert that is effectively cooled, yet which has a hardening coating.

SUMMARY OF THE INVENTION

The shortcomings in the technology are remedied by a metalworking apparatus comprising a threading insert having a top side, a bottom side and a front side having crests and valleys with a cutting surface, a channel-less chip breaker having a top side and a bottom side, and a holder for holding the threading insert and the channel-less chip breaker so that the top side of the threading insert contacts the bottom side of the channel-less chip breaker and crests and valleys of the threading insert face away from the holder. The threading insert includes (i) one cooling channel disposed on the top side of the threading insert for each crest and each valley, each cooling channel terminating near the cutting region of the crest or valley, and (ii) a ceramic coating on at least the cutting region of the crests and valleys, with each cooling channel being uncoated.

DETAILED DESCRIPTION OF THE PREFERRED EMBODIMENT

The present invention includes a threading insert modified with cooling channels in an innovative way for extending tool life.

Figure 1:
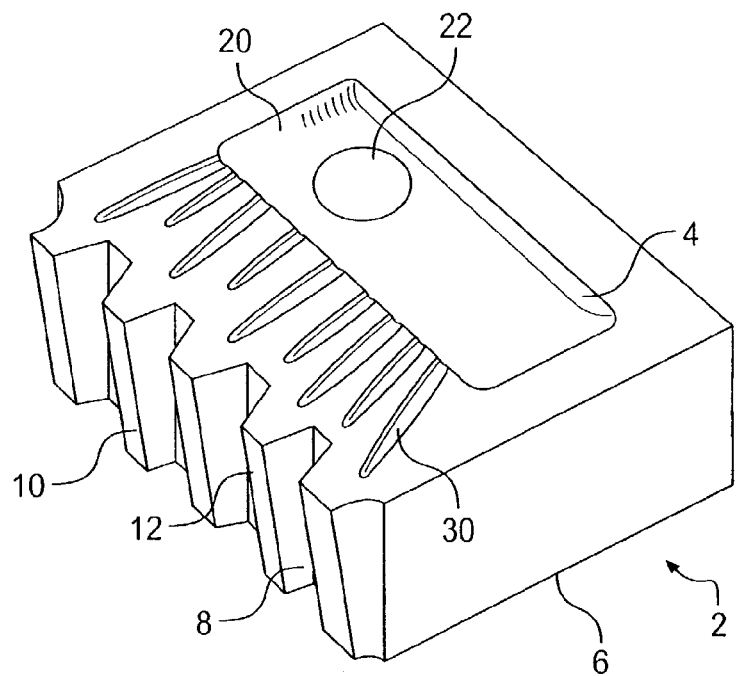
FIG. 1 is a perspective view of a cutting insert according to the invention.

FIG. 1 shows a threading insert 2, which generally comprises a top side 4, a bottom side 6 and a front side 8. The front side 8 includes a plurality of crests 10 and valleys 12 which are the cutting surfaces that form threads in a workpiece.

Figure 2:
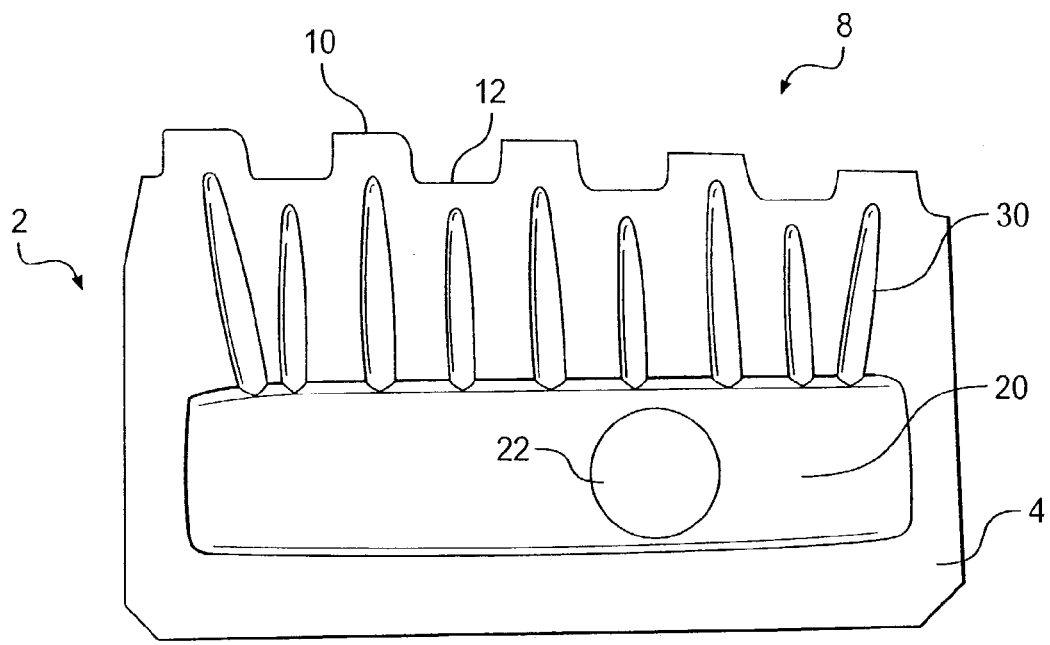
FIG. 2 is a top view of the cutting insert shown in FIG. 1.

As shown in FIG. 2, the top side 4 of the cutting insert 2 has a reservoir tray 20 formed therein. Within the reservoir tray 20 is a hole 22 that extends through the cutting insert 2, and is adapted to align with a conduit carrying pressurized coolant from a lathe or other metalworking machine. The top side 4 has one cooling channel 30 for each crest 10 and each valley 12. However, it is conceived that more than one cooling channel can be provided for each crest 10 or each valley 12.

Nevertheless, providing at least one cooling channel 30 per crest 10 and one cooling channel 30 per valley 12 increases the heat removal rate because the coolant reaches more hot spots. Thus, the heat removal rate is more efficient and the tool life is increased.

The tip of the cooling channels 30 are placed at an optimum distance from the cutting edge to enhance heat removal. The cooling channel 30 preferably extends up to a line, or transition zone, that separates a region of severe wear from that of moderate wear.

The method used to determine the line is based on Scanning Electron Microscope observations. The transition from severe to moderate wear is seen as an abrupt change of the density of surface marks, such as cracks, grooves, etc. Theoretically, the position of this line, depends on the machining conditions, insert characteristics and material properties. Nonetheless, the location as a practical matter can be determined with the Scanning Electron Microscope.

The cooling channel 30 preferably will not extend into a zone of severe wear, since the pressure resulting from the contact between the insert 2 and the workpiece is very high and it is preferable to have as much area as possible to support those pressures. However, moving away from this high-pressure zone, the pressure drops abruptly in the moderate wear zone. Thus, cooling can be effectively provided by extending the channels 30 into the moderate wear zone. Providing coolant to the moderate wear zone reduces wear further, since many wear mechanisms, such as built up edge and adhesive wear, are triggered by temperature.

The cooling channel 30 may have different cross-sectional shapes and sizes. Nevertheless, it is preferable for the channel width not to exceed 30% of a corresponding crest 10. Also, from a fluid mechanics point of view it is preferable for the cross-sectional shape to be a half circle. In this way, the insert 2 is not excessively weakened.

The cutting insert 2 is coated with a ceramic coating, such as aluminum oxide or titanium nitride. Such coatings lend hardness to the cutting insert so that it can maintain its sharpness. Preferably, the ceramic coating covers the entire insert 2 with the exception of the cooling channels 30. Leaving the cooling channels 30 uncoated enhances heat removal because the underlying metal is a good heat conductor but the ceramic coating is a poor heat conductor.

Figure 3:
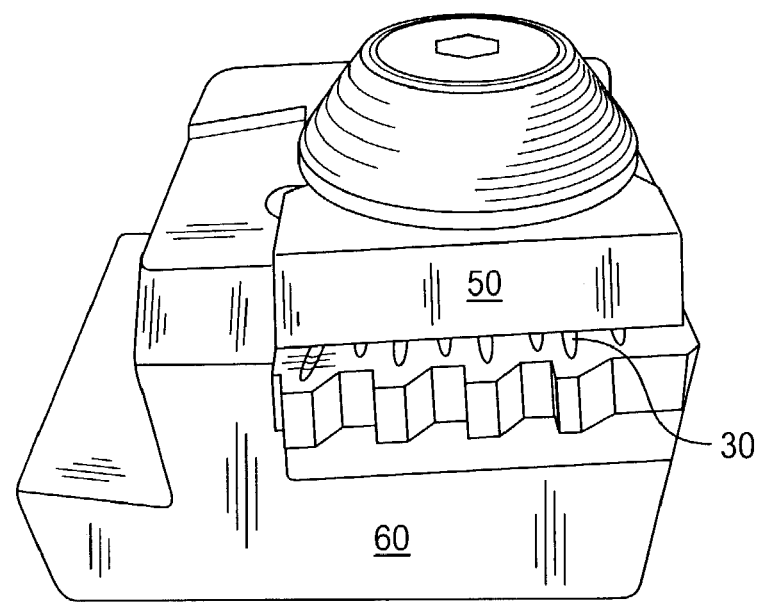
FIG. 3 is a perspective view of a tool holding the cutting insert of FIG. 1 and a chip breaker.

The cutting insert 2 is adapted to be held in a tool 60, such as shown in FIG. 3, with a chip breaker 50 abutting the top side 4. The tool 60 is a rigid member that supports the chip breaker 50 and the cutting insert 2 in a machine such as a lathe. The tool 60 includes internal passageways for coolant, which is fed to the hole 22, which in turn fills the reservoir tray 20, which in turn supplies coolant to the cooling channels 30.

Figure 4:
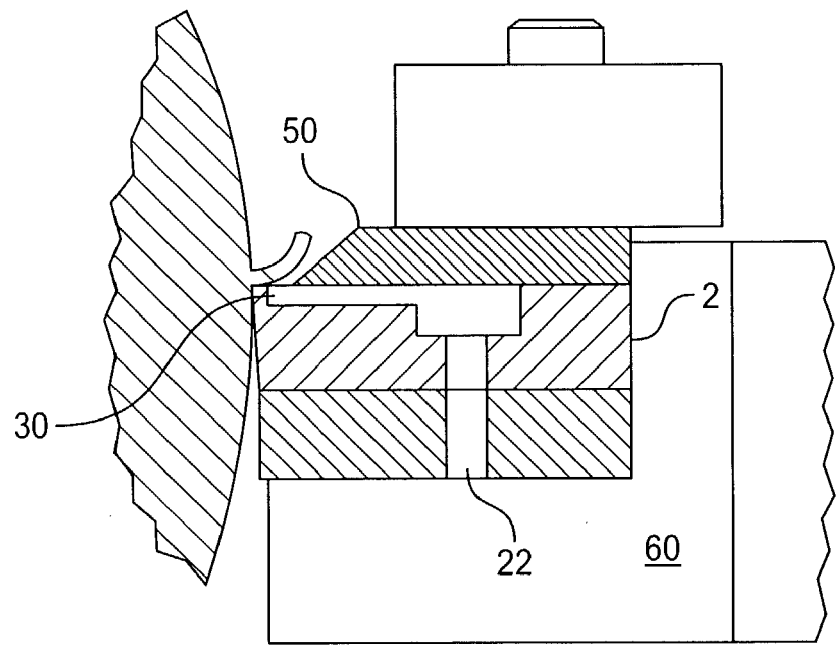
FIG. 4 is a side elevational view of the cutting insert according to the present invention cutting a workpiece.
Figure 5:
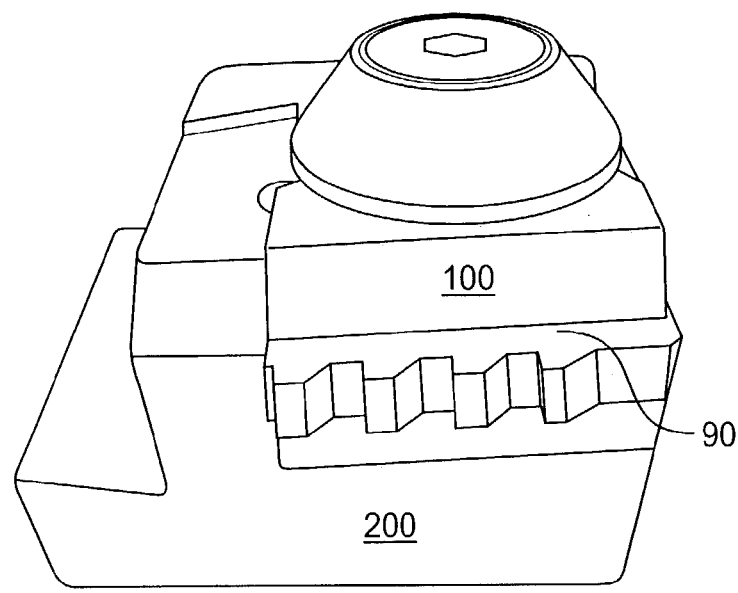
FIG. 5 shows a perspective view of a conventional cutting insert held in a fixture.
Figure 6:
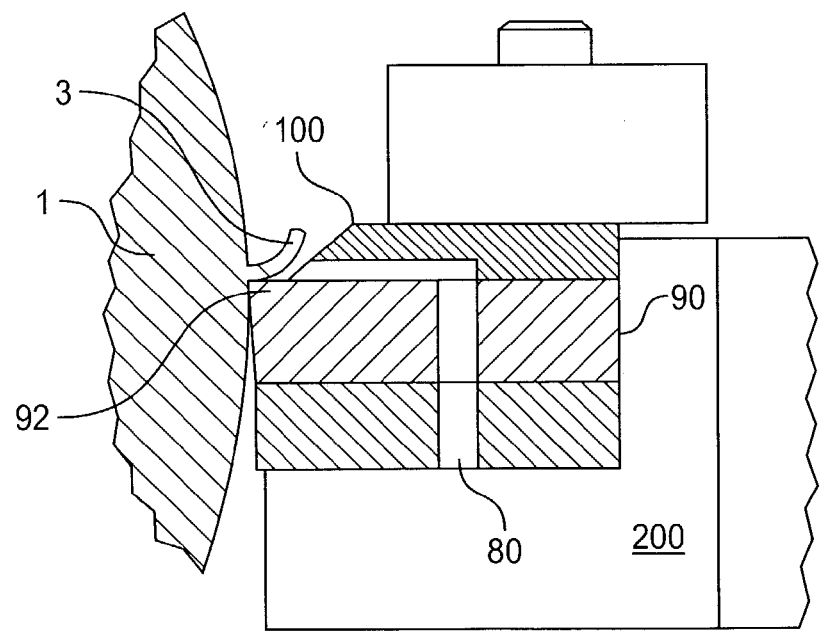
FIG. 6 is a partial cross-sectional view of the cutting insert of FIG. 5 cutting a workpiece.

As seen in FIG. 3, the cooling channels 30 protrude beyond the end of the chip breaker 50. As a result, the coolant flows out of the cooling channels 30 onto the workpiece that is being cut. As shown in FIG. 4, the coolant issuing from the cooling channels 30 and the chip breaker 50 combine to break up the chip as it peels off the workpiece. The placement of the cooling channels of this invention are particularly advantageous because they supply pressurized coolant to the underside of the chip, thus helping to break the chip.

The chip breaker 50 itself may include cooling channels on its underside that correspond to the cooling channels 30 in the cutting insert 2. However, cooling channels on the chip breaker 50 are not necessary.

In addition, because the coolant pressure is inversely proportional to the total number of cooling channels, providing cooling channels only in the insert will produce a greater pressure jet of coolant. This is particularly important when a medium-pressure (i.e., about 10 bar to about 100 bar) coolant supply is used.

By using the cutting insert according to the present invention, the life of the cutting insert can be increased substantially. For example, we have found that the the number of workpieces machined with the cutting insert of the present invention increases 16% over a standard insert when cutting a Buttress 1-2-3 thread. Cutting other types of threads, such as an AMS 4TPI thread, increases the number of workpieces machined per insert by 26%. Cutting an SEC 6 TPI thread increases the number of workpieces machined by 30%.

A preferred embodiment of the invention has been described in detail for the purpose of disclosing a practical, operative structure whereby the invention may be practiced advantageously. These designs are intended to be illustrative, and not exhaustive. Thus, the claims should be looked to in order to assess the full scope of the invention.

We claim:

1. A metalworking apparatus comprising:
   a threading insert having a top side, a bottom side and a front side, the front side including crests and valleys having a cutting region for cutting a workpiece, said threading insert including (i) at least one cooling channel disposed on the top side of said threading insert for each crest and each valley, each cooling channel terminating near the cutting region of the crest or valley, and (ii) a ceramic coating on said top side of the threading insert that is at least near the cutting region of the crests and valleys, but with each cooling channel on said top side being uncoated;
   a channel-less chip breaker having a top side and a bottom side; and
   a holder for holding said threading insert and said channel-less chip breaker so that the top side of said threading insert contacts the bottom side of said channel-less chip breaker and the crests and valleys face away from said holder.

2. The metalworking apparatus according to claim 1, wherein the length of at least one cooling channel is based on the location of a transition zone for a wear characteristic of said threading insert.

3. The metalworking apparatus according to claim 1, wherein the ceramic coating comprises at least one of aluminum oxide and titanium nitride.

4. The metalworking apparatus according to claim 1, said threading insert further including a reservoir cut out of the top side of said threading insert such that each cooling channel has one end that terminates in said reservoir and one end that terminates near the cutting region of the crest or valley.

5. The metalworking apparatus according to claim 4, wherein a pressurized coolant is supplied to said reservoir and flows through each cooling channel.

6. The metalworking apparatus according to claim 5, wherein the pressurized coolant is pressurized to a range of 10 to 100 bar.

7. The metalworking apparatus according to claim 4, wherein said reservoir and each cooling channel are machined into said threaded insert.

8. The metalworking apparatus according to claim 4, wherein said reservoir and each cooling channel are molded as a part of said threaded insert.

9. The metalworking apparatus according to claim 1, wherein each cooling channel is centered about the crest or valley.

10. The metalworking apparatus according to claim 1, wherein the width of at least one cooling channel of said channels for each crest and each valley is less than or equal to 30% of the width of a corresponding crest.

11. The metalworking apparatus according to claim 1, wherein at least one cooling channel of said channels for each crest and each valley extends into a transition zone that separates a region of severe wear from a region of moderate wear on said threading insert.

* * * * *